United States Patent
Pace et al.

(10) Patent No.: US 10,659,763 B2
(45) Date of Patent: May 19, 2020

(54) STEREO CAMERA SYSTEM WITH WIDE AND NARROW INTEROCULAR DISTANCE CAMERAS

(71) Applicants: Vincent Pace, Shadow Hills, CA (US); Patrick Campbell, Stevenson Ranch, CA (US); James Cameron, Malibu, CA (US)

(72) Inventors: Vincent Pace, Shadow Hills, CA (US); Patrick Campbell, Stevenson Ranch, CA (US); James Cameron, Malibu, CA (US)

(73) Assignee: CAMERON PACE GROUP LLC, Burbank, CA (US)

( * ) Notice: Subject to any disclaimer, the term of this patent is extended or adjusted under 35 U.S.C. 154(b) by 641 days.

(21) Appl. No.: 13/648,136

(22) Filed: Oct. 9, 2012

(65) Prior Publication Data
US 2014/0098195 A1    Apr. 10, 2014

(51) Int. Cl.
G06T 13/20    (2011.01)
H04N 13/25    (2018.01)
H04N 13/243    (2018.01)

(52) U.S. Cl.
CPC .......... *H04N 13/25* (2018.05); *H04N 13/243* (2018.05)

(58) Field of Classification Search
CPC .......................... H04N 13/025; H04N 13/0242
USPC ............................................ 348/47, E13.074
See application file for complete search history.

(56) References Cited

U.S. PATENT DOCUMENTS

| | | |
|---|---|---|
| 3,990,087 A | 11/1976 | Marks |
| 4,557,570 A | 12/1985 | Hines |
| 4,650,305 A | 3/1987 | Hines |
| 4,725,863 A | 2/1988 | Dumbreck et al. |
| 4,751,570 A | 6/1988 | Robinson |
| 4,881,122 A | 11/1989 | Murakami |
| 4,999,713 A | 3/1991 | Ueno et al. |
| 5,140,415 A | 8/1992 | Choquet |
| 5,175,616 A | 12/1992 | Milgram |
| 5,465,128 A | 11/1995 | Wah Lo et al. |
| 5,532,777 A | 7/1996 | Zanen |
| 5,699,108 A | 12/1997 | Katayama et al. |

(Continued)

FOREIGN PATENT DOCUMENTS

| | | | |
|---|---|---|---|
| JP | H05-265547 | * | 3/1992 |
| JP | H11-39596 A | * | 7/1997 |

*Primary Examiner* — Zaihan Jiang
(74) *Attorney, Agent, or Firm* — Marc E. Hankin; Kevin Schraven; Hankin Patent Law, APC (57) ABSTRACT

A stereographic camera system and method of operating a stereographic camera system. A camera platform may include a first camera head including first left and right cameras separated by a first interocular distance, the first camera head providing first left and right video streams, and a second camera head aligned with the first camera head, the second camera head including second left and right cameras separated by a second interocular distance, the second camera head providing second left and right video streams. An output selector may select either the first left and right video streams or the second left and right video streams to output as a 3D video output. The first interocular distance may be settable over a first range, and the second interocular distance may be settable over a second range, at least a portion of the second range smaller than the first range.

18 Claims, 9 Drawing Sheets

(56) References Cited

U.S. PATENT DOCUMENTS

| | | | |
|---|---|---|---|
| 5,727,239 | A | 3/1998 | Hankawa |
| 5,737,655 | A | 4/1998 | Inaba |
| 5,740,337 | A | 4/1998 | Okino et al. |
| 5,801,760 | A | 9/1998 | Uomori |
| 5,864,360 | A | 1/1999 | Okauchi et al. |
| 5,974,272 | A | 10/1999 | Kiesow et al. |
| 5,978,015 | A | 12/1999 | Ishibashi et al. |
| 6,160,607 | A | 12/2000 | Diaconu |
| 6,292,634 | B1 | 9/2001 | Inaba |
| 6,388,666 | B1 | 5/2002 | Murray |
| 6,414,709 | B1 | 7/2002 | Palm et al. |
| 6,466,746 | B2 | 10/2002 | Inaba |
| 6,512,892 | B1 | 1/2003 | Montgomery et al. |
| 6,701,081 | B1 | 3/2004 | Dwyer et al. |
| 6,798,406 | B1 | 9/2004 | Jones et al. |
| 6,909,457 | B1 | 6/2005 | Fukasawa |
| 7,031,512 | B2 | 4/2006 | Ng |
| 7,190,389 | B1 | 3/2007 | Abe et al. |
| 7,218,342 | B2 | 5/2007 | Kobayashi et al. |
| 7,551,272 | B2 | 6/2009 | Vodanovic |
| 7,899,321 | B2 | 3/2011 | Cameron et al. |
| 8,170,412 | B2 * | 5/2012 | Cameron ............. G03B 17/561 248/187.1 |
| 2001/0056477 | A1 | 12/2001 | McTernan et al. |
| 2002/0012043 | A1 | 1/2002 | Guerin et al. |
| 2005/0041095 | A1 | 2/2005 | Butler-Smith et al. |
| 2005/0190180 | A1 | 9/2005 | Jin et al. |
| 2006/0204240 | A1 | 9/2006 | Cameron et al. |
| 2007/0103675 | A1 | 5/2007 | Vodanovic |
| 2007/0140682 | A1 | 6/2007 | Butler-Smith et al. |
| 2007/0146478 | A1 | 6/2007 | Butler-Smith et al. |
| 2007/0247614 | A1 | 10/2007 | Puah et al. |
| 2008/0007567 | A1 | 1/2008 | Clatworthy et al. |
| 2008/0123938 | A1 | 5/2008 | Kim |
| 2008/0158345 | A1 | 7/2008 | Schklair |
| 2009/0060273 | A1 | 3/2009 | Stephen et al. |
| 2009/0262184 | A1 | 10/2009 | Engle et al. |
| 2011/0085789 | A1 * | 4/2011 | Campbell ............. G03B 35/00 396/325 |
| 2011/0243542 | A1 * | 10/2011 | Pace .................... G03B 35/08 396/325 |
| 2012/0287243 | A1 * | 11/2012 | Parulski ............... H04N 13/00 348/46 |

\* cited by examiner

STEREO CAMERA SYSTEM WITH WIDE AND NARROW INTEROCULAR DISTANCE CAMERAS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to stereoscopy.

Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on objects afar, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance IOD. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. The amount of disparity that a viewer can accommodate, commonly called the disparity limit, varies among viewers. The disparity limit is also known to vary with image content, such as the size of an object, the proximity of objects within an image, the color of objects, and the rate of motion of objects within the image. The disparity limit, expressed as the angle between the lines of sight of the viewer's eyes, may be about 12-15 minutes of arc for typical stereoscopic images.

A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of a second polarization state. Stereoscopic displays of this type typically project the two polarized images onto a common projection screen. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
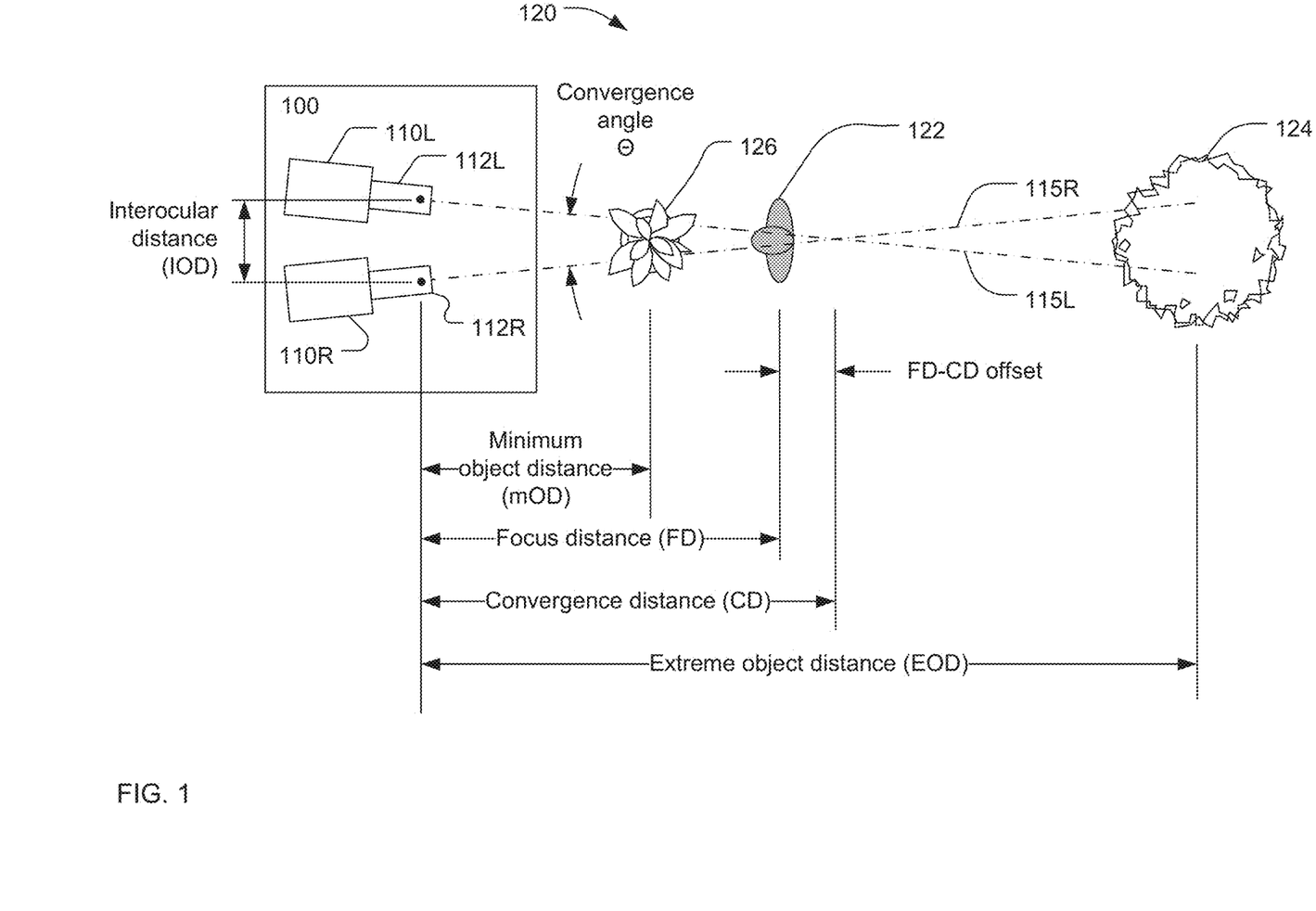
FIG. 1 is a schematic drawing of a stereographic camera in an environment.

Referring now to FIG. 1, a stereographic camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. The left and right cameras 110L, 110R may be separated by an interocular distance IOD. Each of the left and right cameras 110L, 110R may include a lens 112L, 112R, respectively. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The cameras 110L, 110R may be disposed such that the axes 115L, 115R are parallel or such that a convergence angle Θ is formed between the two axes 115L, 115R. The cameras 110L, 110R may be disposed such that the axes 115L, 115R cross at a convergence distance CD from the cameras. The interocular distance IOD, the convergence distance CD, and the convergence angle Θ are related by the formula $$\Theta = 2 \, A \, \text{TAN}(\text{IOD}/2\text{CD}), \text{ or} \tag{1}$$

$$\text{CD} = \text{IOD}/[2 \, \text{TAN}(\Theta/2)]. \tag{2}$$

The interocular distance IOD and the convergence distance CD may be measured from a nodal point, which may be the center of an entrance pupil, within each of the lenses 112L, 112R. Since the entrance pupils may be positioned close to the front of the lenses 112L, 112R, the interocular distance IOD and the convergence distance CD may be conveniently measured from the front of the lenses 112L, 112R.

The stereographic camera 100 may be used to form a stereographic image of a scene 120. As shown in the simplified example of FIG. 1, the scene 120 may include a primary subject 122, which is shown, for example, as a person. The scene 120 may also include other features and objects in the foreground (between the primary subject and the camera) and the background (behind the primary subject). The distance from the cameras 110L, 110R to the furthest background object 124, which is shown, for example, as a tree, may be termed the extreme object distance EOD. The distance from the cameras 110L, 110R to the closest foreground object 126, which is shown, for example, as a plant, may be termed the minimum object distance mOD.

When the images from a stereographic camera, such as the stereographic camera 100, are displayed on a viewing screen, scene objects at the convergence distance will appear to be in the plane of the viewing screen. Scene objects, such as the primary subject 122 in the example of FIG. 1, located closer to the stereographic camera may appear to be in front of the viewing screen. Scene objects, such as the furthest background object 124, located further from the stereographic camera may appear to be behind the viewing screen. Scene objects, such as the closest foreground object 126, located closer to the stereographic camera may appear to be in front of the viewing screen and the primary subject 122.

Each lens 112L, 112R may have adjustable focus. The stereographic camera may have a focus adjusting mechanism to synchronously adjust the focus of the two lenses such that both lenses 112L, 112R may be focused at a common adjustable focus distance FD. The focus adjusting mechanism may couple the focus of the two lenses 112L, 112R mechanically, electrically, electromechanically, electronically, or by another coupling mechanism. The focus distance FD may be adjusted manually, or may be automatically adjusted. In this patent, the term "automatically" means "without operator involvement". The focus distance FD may be adjusted such that the cameras 110L, 110R are focused on the primary subject 122. The focus distance may be automatically adjusted in response to a sensor (not shown) that determines the distance from the cameras 110L, 110R to the primary subject 122. The sensor to determine the distance from the cameras to the primary subject may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 122. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen. The difference between the focus distance FD and the convergence distance CD may be an adjustable or predetermined offset. The offset may be absolute, in which case the convergence distance may be calculated by the formula $$\text{CD} = \text{FD} + \alpha \tag{3}$$

where α is the offset as an absolute dimension. The offset may be relative, in which case the convergence distance may be calculated by the formula $$\text{CD} = (\text{FD})(1+\beta) \tag{4}$$

where β is the offset as a portion of FD. For example, an absolute offset α may be a distance measurement such as one foot or two meters, and a relative offset β may be an expression of a relationship or ratio, such as 5% or 10%. Both the absolute offset and the relative offset may be zero, in which case CD=FD.

Each lens 112L, 112R may also have zoom capability, which is to say that the focal length FL of each lens may be adjusted. The stereographic camera 100 may have a focal length adjusting mechanism to synchronously adjust the focal length of the two lenses such that both lenses 112L, 112R may always have precisely the same focal length. The focal length adjustment of the two lenses 112L, 112R may be coupled mechanically, electrically, electronically, electromechanically, or by another coupling mechanism. Commonly, the focal length of the lenses 112L, 112R may be adjusted manually. The focal length of the two lenses 112R, 112L may also be adjusted automatically in accordance with a predetermined scenario.

Figure 2:
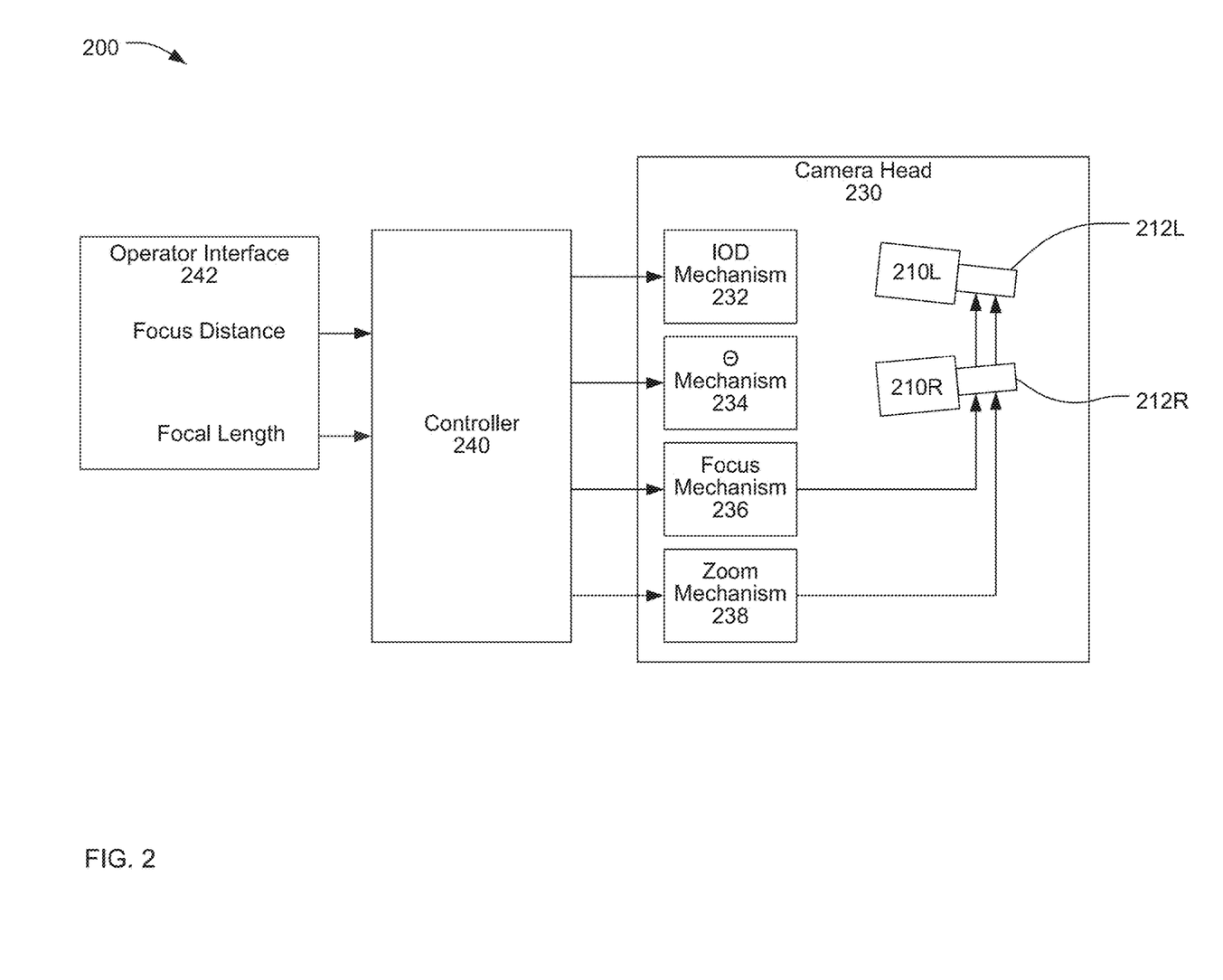
FIG. 2 is a block diagram of a stereographic camera system.

Referring now to FIG. 2, a stereographic camera system 200 may include a camera head 230 coupled to a controller 240. The camera head 230 may include a left camera 210L and a right camera 210R, each of which has an associated lens 212L, 212R. The camera platform may include an IOD mechanism 232 to adjust an interocular distance between the left camera 210L and the right camera 210R. The camera platform may include a Θ mechanism 234 to adjust a convergence angle between the left camera 210L and the right camera 210R. Both the IOD mechanism 232 and the Θ mechanism 234 may include one or more movable platforms or stages coupled to motors or other actuators. The IOD mechanism 232 and the Θ mechanism 234 may be adapted to set the interocular distance and the convergence angle, respectively, in response to data received from the controller 240. Within this patent, the term "data" is intended to include digital data, commands, instructions, digital signals, analog signals, optical signals and any other data that may be used to communicate the value of a parameter such as interocular distance or convergence angle.

The camera head 230 may include a focus mechanism 236 to synchronously adjust and set the focus distance of the lenses 212L, 212R. The focus mechanism 236 may include a mechanical, electronic, electrical, or electro-mechanical linkage between the lenses 212L, 212R to simultaneously adjust the focus distance of both lenses to the same value. The focus mechanism 236 may include a motor or other actuator adapted to set the focus distance in response to data received from the controller 240. The focus mechanism 236 may be manually controlled by an operator such as a cameraman or assistant cameraman (commonly called a "focus puller"). When manually controlled, the focus mechanism 236 may include an encoder, potentiometer, or other sensor to provide data indicating the focus distance to the controller 240. The focus mechanism 236 may be adapted to operate under manual control and/or in response to data received from the controller 240.

The camera head 230 may include a zoom mechanism 238 to synchronously adjust and set the focal length of the lenses 212L, 212R. The zoom mechanism 238 may include a mechanical, electronic, electrical, or electro-mechanical linkage between the lenses 212L, 212R to simultaneously adjust the focal length of both lenses to the same value. The zoom mechanism 238 may include a motor or other actuator adapted to set the focal length in response to data received from the controller 240. The zoom mechanism 238 may be manually controlled by an operator such as a cameraman or assistant cameraman. When manually controlled, the zoom mechanism 238 may include an encoder, potentiometer, or other sensor to provide data indicating the focal length to the controller 240. The zoom mechanism 238 may be adapted to operate either under manual control or in response to data received from the controller 240.

The controller 240 may be coupled to an operator interface 242. The controller 240 may receive data from the operator interface 242 indicating the desired focus distance and focal length of the lenses 212L, 212R.

The operator interface 242 may be partially or wholly incorporated into the camera head 230. The operator interface 242 may be close to the camera head 230 or partially or wholly remote from the camera head 230 For example, the focus mechanism 236 and/or the zoom mechanism 238 may be manually controlled by one or more operators such as a cameraman and/or an assistant cameraman. In this case, the focus mechanism 236 and/or the zoom mechanism 238 may provide data to the controller 240 indicating the manually-set focus distance and/or focal length. Similarly, control actuators to set the focus-convergence offset and/or the maximum allowable disparity may be located on the camera platform for operation by the cameraman and/or the assistant cameraman.

The operator interface 242 may be partially or wholly incorporated into the controller 240.

The controller 240 may interface with the camera head 230. The controller 240 may be integrated into the camera head 230. The controller may provide data to and/or receive data from the focus mechanism 236 and the zoom mechanism 238 indicating the focus distance and focal length, respectively, of the lenses 212L, 212R. The controller 240 may provide data to the IOD mechanism 232 and the Θ mechanism 234 to set the interocular distance and the convergence angle, respectively, between the cameras 210L, 210R. The controller 240 may provide data to the IOD mechanism 232 and the Θ mechanism 234 based on the focus distance and focal length of the lenses 212L, 212R, and known or assumed distances to the nearest foreground object and/or the furthest background object. The controller 240 may provide data to the IOD mechanism 232 to set the interocular distance such that the largest disparity in the recorded image does not exceed the maximum allowable disparity value.

The controller 240 may be coupled to the camera head 230 and the operator interface 242 via a network which may be a local area network; via one or more buses such as a USB bus, a PCI bus, a PCI Express bus, or other parallel or serial data bus; or via one or more direct wired or wireless connections. The controller 240 may be coupled to the camera head 230 and the operator interface 242 via a combination of one or more of direct connections, network connections, and bus connections.

Figure 3A:
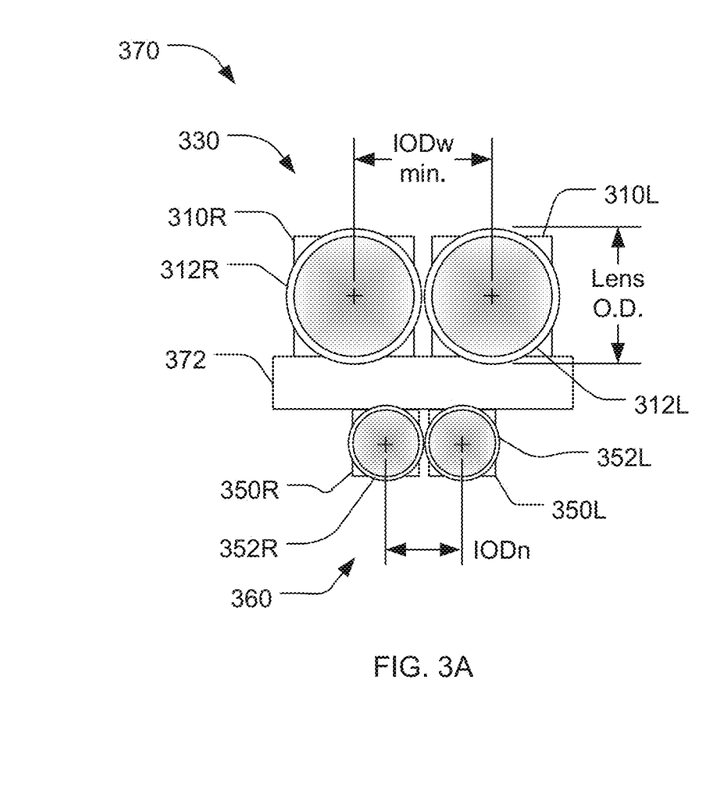
FIG. 3A is a front view of a stereoscopic camera system with wide and narrow interocular distance cameras.
Figure 3B:
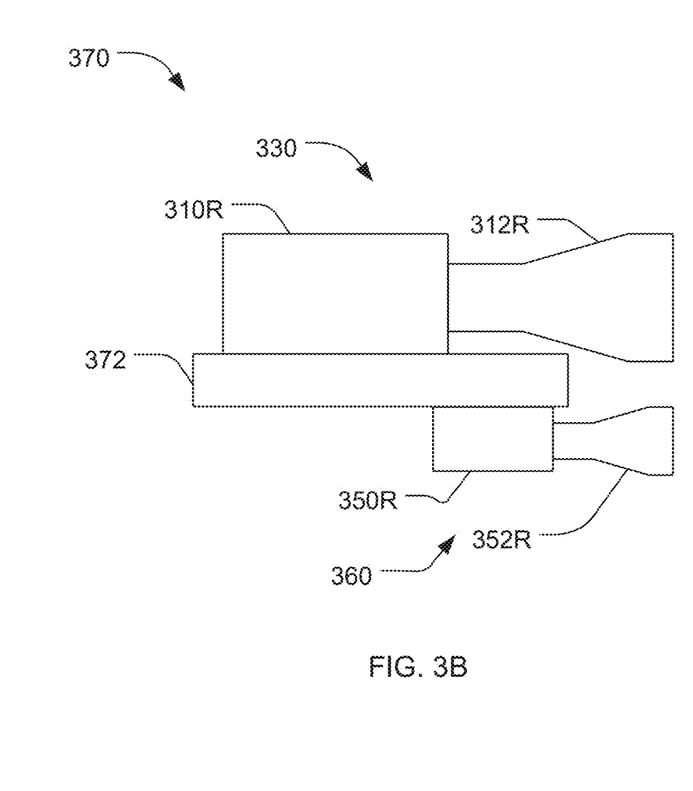
FIG. 3B is a side view of the stereoscopic camera system with wide and narrow interocular distance cameras.

FIG. 3A and FIG. 3B are front and side schematic views of a stereographic camera platform 370 that includes two stereographic camera heads, which, for reasons to become evident, will be called the wide IOD camera head 330 and the narrow IOD camera head 360. The wide IOD camera head 330 may include left and right cameras 310L, 310R, each of which has a respective lens 312L, 312R. The narrow IOD camera head 360 may include left and right cameras 350L, 350R, each of which has a respective lens 352L, 352R. The wide IOD camera head 330 and the narrow IOD camera head 360 may be supported by a structure 372. The structure 372 may enclose or support mechanisms (not shown) to adjust the interocular distances and convergence angles of the wide IOD camera head 330 and the narrow IOD camera head 360.

The interocular distance IODw of the wide IOD camera head 330 may be settable over a first range from a predetermined minimum to a predetermined maximum. As can be understood from FIG. 3A, mechanical interference limits the minimum for IODw to not less than the outside diameter (OD) of either of the lenses 312L, 312R and not less than the width of the cameras 310L, 301R. In some situations, the minimum of IODw may be larger than desired when capturing objects close to the cameras. Using a wider IOD than desired may result in stereographic images that result in eyestrain and discomfort to the viewer.

For example, cameras 310L, 310R may be 1080i or 1080p HDTV cameras using ⅔ inch or larger image sensors. Such cameras are commonly equipped with lenses that zoom, or change focal length over a 16:1 or greater range (i.e. the ratio of the longest focal length to the shortest focal length is at least 16:1). Such lenses are at least 85 millimeters in diameter and may be 110 millimeters diameter or larger for higher zoom ratios. The minimum IOD for a stereographic camera head including two of these lenses will be significantly higher than the 65 millimeter IOD of a typical adult. A stereographic HDTV camera using high ratio zoom lenses may produce uncomfortably exaggerated image depth for subjects close to the camera.

To allow the use of high zoom ratio lenses while preserving the ability to provide comfortable stereo images of close subjects, the stereographic camera platform 370 includes a narrow IOD camera head 360 that can be used as an alternative to the wide IOD camera head 330 to capture images of close subjects. The interocular distance IODn of the narrow IOD camera head 360 may be settable over a second range, where all or a substantial portion of the second range is smaller than the minimum of the first range. The second range may consist of a single value, which is to say IODn may be nonadjustable or fixed. In this case, the fixed value of IODn may be smaller than the minimum of the first range.

To allow a small interocular distance, the narrow IOD camera head 360 may sacrifice performance compared to the wide IOD camera head 330. For example, the narrow IOD cameras 350R, 350L may use smaller image sensors, such as a ½ inch or ⅓ inch sensor, than the image sensors within the wide IOD cameras 310R, 310L. The use of a smaller image sensor may allow a reduction in the width of the camera and allow the use of smaller diameter lenses. However, the use of smaller images sensors may compromise the resolution, sensitivity, noise, or other performance parameters of the narrow IOD cameras 350L, 350R compared to the wide IOD cameras 310L, 310R. Further, the lenses 352L, 352R of the narrow IOD camera head 360 may have fixed focal length or a limited zoom range consistent with a smaller lens diameter. To minimize the size and weight of the narrow IOD camera head 360, IODn and/or the convergence angle between the cameras 350L, 350R may be fixed.

Figure 4:
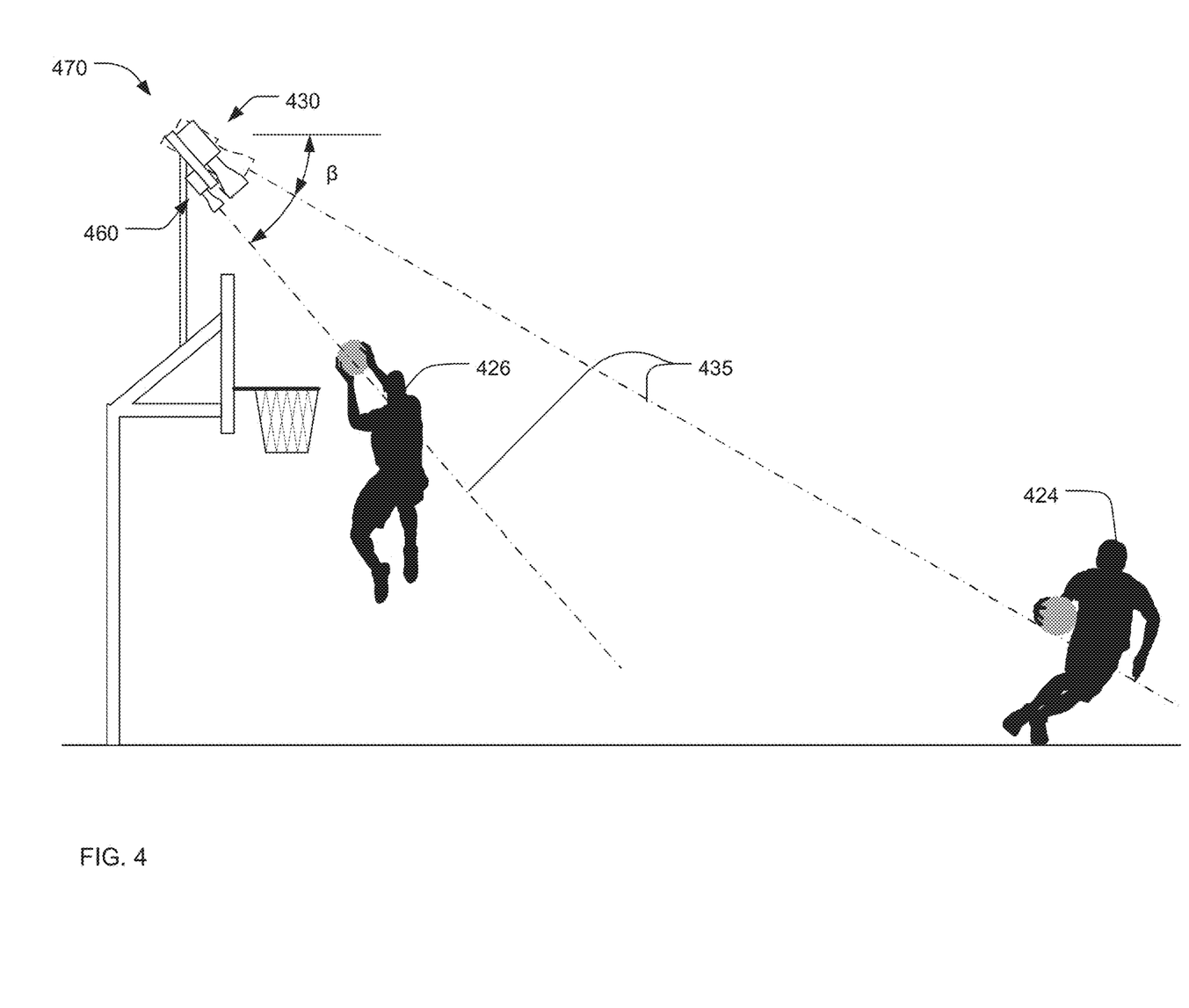
FIG. 4 is a representation of the stereoscopic camera system with wide and narrow interocular distance cameras in an environment.

FIG. 4 shows an exemplary application of the stereographic camera platform 470, which may be the stereographic camera platform 370. The stereographic camera platform 470 may include a wide IOD camera head 430 and a narrow IOD camera head 460 mounted to a pan and tilt mechanism (not shown) above the backboard on a basketball court. The pan and tilt mechanism may be remotely controlled to aim a line of sight 435 of the stereographic camera platform 470 to capture an object of interest, such as player 424, at any position on the basketball court. However, when the action occurs immediately in front of the stereographic camera platform 470, such as player 426 about to dunk the ball, the minimum IOD of the wide IOD camera head 430 may be too large to provide a comfortable stereo image. In this situation, the narrow IOD camera head 460 may be used to capture the image.

Figure 5:
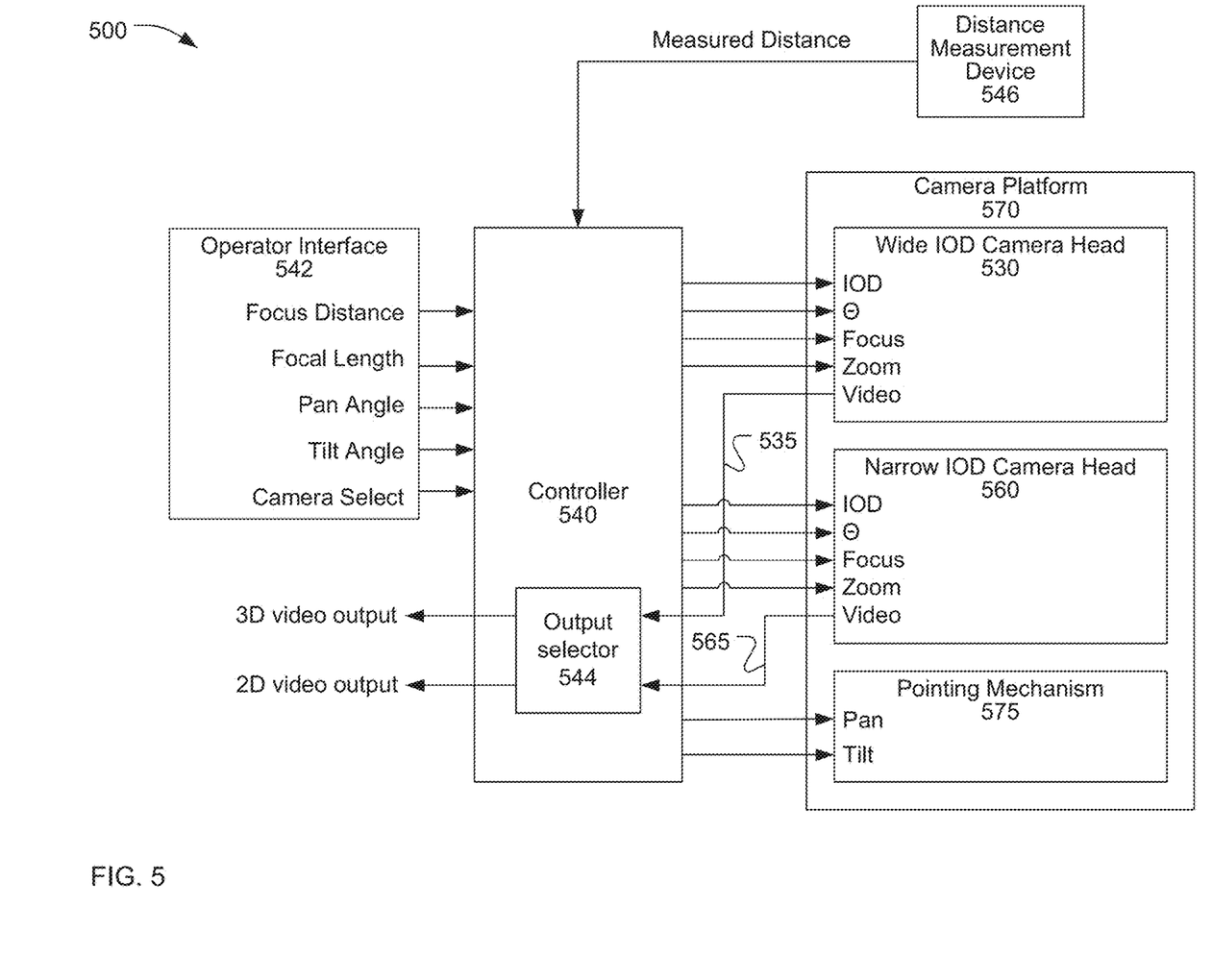
FIG. 5 is a block diagram of a stereoscopic camera system with wide and narrow interocular distance cameras.

Referring now to FIG. 5, a stereographic camera system 500 may include a camera platform 570, which may be the stereographic camera platform 370 or 470, a controller 540, and an operator interface 542. The camera platform 570 may include a wide IOD camera head 530 and a narrow IOD camera head 560. When the operator interface 542 is located remotely from the camera platform 570, the camera platform 570 may include a pointing mechanism 575 to set a pan angle and/or a tilt angle of the camera heads in response to instructions received from the operator interface 542 via the controller 540.

The wide IOD camera head 530 may be equivalent or similar to the camera head 230 of FIG. 2. The wide IOD camera head 530 may include left and right cameras with respective lenses, mechanisms for setting an interocular distance IOD and convergence angle Θ between the left and right cameras, and mechanisms for setting the focal length and focus distance of the left and right lenses, as described for the camera head 230. The wide IOD camera head 530 may receive data from the controller 540 to control the IOD, Θ, focal length, and focus distance mechanisms. In some cases, the focus distance of the lenses may be set automatically by an autofocus system within the wide IOD camera head 530. The wide IOD camera head 530 may transmit a first video stream 535 to the controller 540. The first video stream 535 may be a digital stream and/or one or more digital or analog signals. The first video stream 535 may include a first left video stream and a first right video stream (not shown) generated by the left and right cameras, respectively, of the wide IOD camera head 530.

The narrow IOD camera head 560 may include left and right cameras with respective lenses. An interocular distance between the left and right cameras may be fixed or variable, in which case the narrow IOD camera head 560 may include an IOD mechanism to set the IOD based on data received from the controller 540. A convergence angle between the left and right cameras may be fixed or variable, in which case the narrow IOD camera head 560 may include a Θ mechanism to set the convergence angle based on data received from the controller 540. A focal length of the lenses of the left and right cameras may be fixed or variable, in which case the narrow IOD camera head 560 may include a zoom mechanism to set the focal length based on data received from the controller 540. A focus distance of the lenses of the left and right cameras may be fixed or variable, in which case the narrow IOD camera head 560 may include a focus mechanism to set the focus distance based on data received from the controller 540. The focus distance of the lenses may be set automatically by an autofocus system within the narrow IOD camera head 560. The focus distance of the lenses may be automatically set equal to the focus distance of the lenses in the wide IOD camera head 530. The narrow IOD camera head 560 may transmit a second video stream 565 to the controller 540. The second video stream 565 may be a digital stream and/or one or more digital or analog signals. The second video stream 565 may include a second left video stream and a second right video stream (not shown) generated by the left and right cameras, respectively, of the narrow IOD camera head 560.

The operator interface 542 may be partially or wholly incorporated into the camera platform 570. The operator interface 542 may be close to the camera platform 570 or partially or wholly remote from the camera platform 570. The operator interface 542 may be partially or wholly incorporated into the controller 540. The controller 540 may be wholly or partially integrated into the camera platform 570.

The controller 540 may control an output selector 544 to select either the first video stream 535 from the wide IOD camera head 530 or the second video stream 565 from the narrow IOD camera head 560 as a 3D video output from the stereographic camera system 500. The 3D video output may be, for example, broadcast to a live audience. However, the selection of one of the first video stream 535 and the second video stream 565 for the 3D video output does not preclude recording or preserving both the first and second video streams for other uses. The output selector may also select one of the first left video stream, the first right video stream, the second left video stream and the second right video to output as a 2D video output. The 2D video output may be broadcast and/or recorded.

The controller 540 may control the output selector 544 to select either the first video stream 535 or the second video stream 565 for the 3D video output based on a camera select input from the operator interface 542. The controller 540 may select either the first video stream 535 or the second video stream 565 automatically based on one or more criteria, as discussed in the following paragraphs. When the selection of either the first video stream 535 or the second video stream 565 is made automatically, the selection criteria may incorporate hysteresis to prevent switching back and forth between the first video stream 535 and the second video stream 565. In general, the controller 540 may control the output selector 544 to select the first video stream whenever a comfortable 3D image can be captured by the wide IOD camera head, and may select the second video stream whenever a comfortable 3D image cannot be captured by the wide IOD camera head. To this end, the controller 540 may control the output selector 544 to select the first video stream 535 for the 3D video output when capturing objects distant from the stereographic camera system and may select the second video stream 565 for objects close to the camera.

The controller 540 may control the output selector 544 to select the first video stream 535 when the focus distance entered via the operator interface 542 is greater than or equal to a predetermined threshold focus distance, and may control the output selector 544 to select the second video stream 565 when the focus distance is less than the predetermined threshold focus distance.

The controller 540 may calculate a convergence distance for the stereographic camera system based on the focus distance entered via the operator interface 542. The controller 540 may control the output selector 544 to select the first video stream 535 when the convergence distance is greater than or equal to a predetermined threshold convergence distance, and may control the output selector 544 to select the second video stream 565 when the convergence distance is less than the predetermined threshold convergence distance. The predetermined threshold convergence distance may be the same as or different from the predetermined threshold focus distance.

The controller 540 may receive a measured distance from a distance measuring device 546. The distance measuring device 546 may be, for example, an acoustic or laser range finder to measure the distance from the camera platform 570 to a scene object. The controller 540 may control the output selector 544 to select the first video stream 535 when the measured distance is greater than or equal to a predetermined threshold measured distance, and may control the output selector 544 to select the second video stream 565 when the measured distance is less than the predetermined threshold measured distance. The predetermined threshold measured distance may be the same as or different from the predetermined threshold convergence distance and/or the predetermined threshold focus distance.

The controller 540 may calculate a convergence angle Θ for the wide IOD camera head 530 based on the focus distance entered via the operator interface 542. The controller 540 may control the output selector 544 to select the first video stream 535 when the convergence angle is less than or equal to a predetermined threshold convergence angle, and may control the output selector 544 to select the second video stream 565 when the convergence angle is greater than the predetermined threshold convergence angle.

The controller may calculate a target IOD for the stereographic camera system 500 based on the focus distance and focal length entered via the operator interface 542 and known or anticipated distances to objects within the scene being captured. The controller 540 may control the output selector 544 to select the first video stream 535 when the target IOD is greater than or equal to a minimum IOD for the wide IOD camera head 530, and may control the output selector 544 to select the second video stream 565 when the target IOD is less than the minimum IOD for the wide IOD camera head 530.

The controller may calculate a maximum disparity for the wide IOD camera head 530 based on the focus distance and focal length entered via the operator interface 542 and known or anticipated distances to objects within the scene being captured. The controller may analyze the left and right images captured by the wide IOD camera head 530 to estimate depths for objects within the scene being captured. The controller 540 may control the output selector 544 to select the first video stream 535 when the calculated maximum disparity is less than or equal to predetermined threshold disparity, and may control the output selector 544 to select the second video stream 565 when the calculated maximum disparity exceeds the predetermined threshold disparity. The controller 540 may calculate both a maximum forward disparity (disparity of objects that appear to be in front of a viewing screen) and a maximum back disparity (disparity of objects that appear to be behind the viewing screen). When determining which video streams to select, the controller may use the same or different threshold disparity values for front disparity and back disparity.

In some situations, such as the camera installation shown in FIG. 4, the controller may select either the first video stream 535 or the second video stream 565 based on the tilt angle and/or pan angle of the camera. In the example of FIG. 4, the controller may select the first video stream when the tilt angle β is less than or equal to a predetermined angle, and may select the second video stream 565 when the tilt angle is greater than the predetermined angle.

To avoid an abrupt change in the video output when the output selector 544 switches between the first video stream 535 and the second video stream 565, the controller 540 may set the focus distance of the wide IOD camera head 530 and the narrow IOD camera head 560 to be the same, at least when the object distance is near the distance where the switch between the two video streams may occur. The controller 540 may also set the focal lengths of the wide IOD camera head 530 and the narrow IOD camera head 560 to provide the same fields of view (which are determined by the focal lengths of the lenses and the areas of the video sensors within the two camera heads), at least when the object distance is near the distance where the switch between the two video streams may occur. Additionally, the wide IOD camera head 530 and the narrow IOD camera head may be aligned such that an optical axis of the wide IOD camera head and an optical axis of the narrow IOD camera head intersect at about the distance where the switch between the two video streams may occur.

Since the narrow IOD camera head 560 may be used only in limited circumstance when the action being captured occurs close to the camera, the focus distance and focal length of the lenses in the narrow IOD camera may be fixed. Fixing the focus distance and focal length of these lenses reduces the weight and complexity of the camera platform 570. In this case, the controller 540 may cause the output selector 544 to select the second video stream 565 when the desired focus distance is equal to or less than the fixed focus distance of the lenses in the narrow IOD camera head 560.

The output selector 544 may be included in the controller 540 or may be wholly or partially incorporated into the camera platform 570. Partially incorporating the output selector 544 into the camera platform 570 may allow reduction in the bandwidth of the signals transmitted from the camera platform 570 to the controller 540.

Figure 6A:
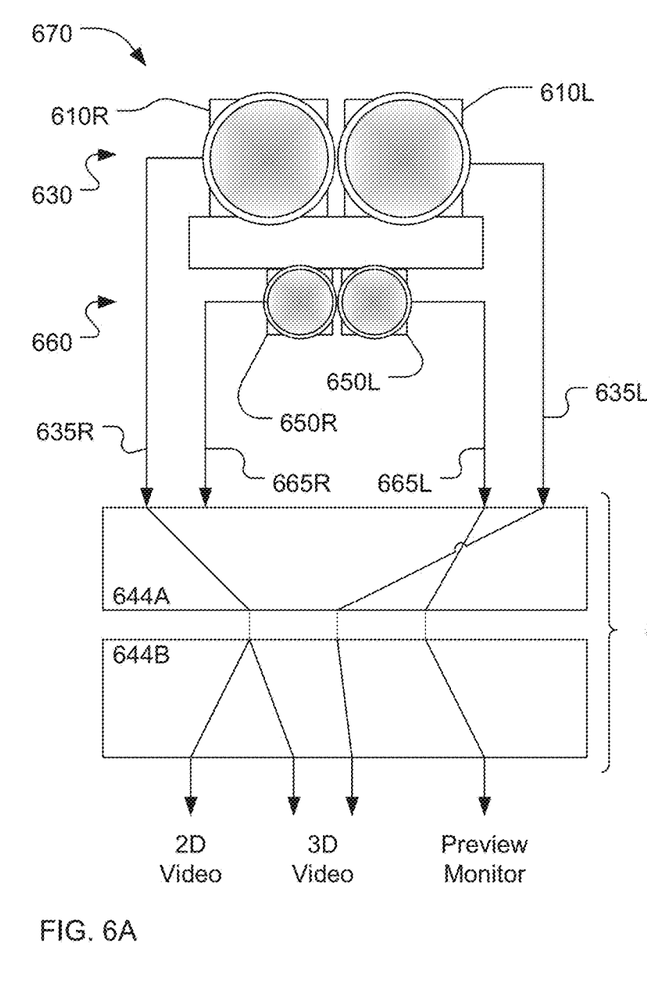
FIG. 6A is another block diagram of a stereoscopic camera system with wide and narrow interocular distance cameras.
Figure 6B:
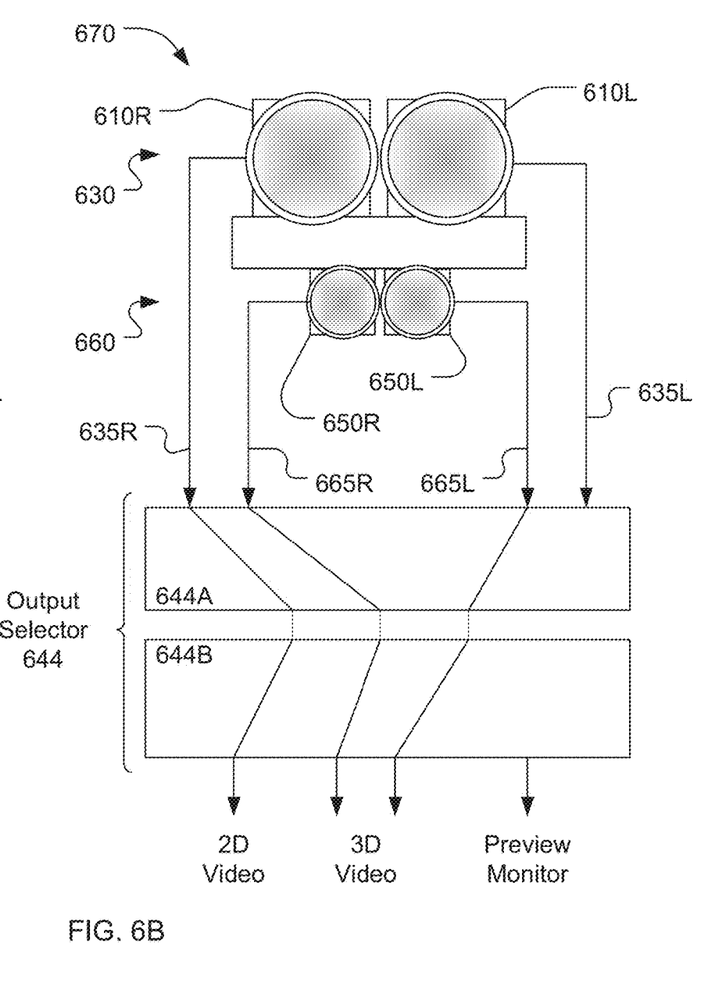
FIG. 6B is another block diagram of a stereoscopic camera system with wide and narrow interocular distance cameras.

FIG. 6A and FIG. 6B are block diagrams of portions of a camera system including a camera platform 670 and an output selector 644, which may be the camera platform 570 and output selector 544, respectively. The camera platform 670 may include a wide IOD camera head 630 and a narrow IOD camera head 660. The wide IOD camera head 630 may include a left camera 610L and a right camera 610R, which output respective video streams 635L and 635R. The narrow IOD camera head 660 may include a left camera 650L and a right camera 650R, which output respective video streams 665L and 665R.

The output selector 644 may include a first portion 664A collocated with the camera platform 670 and a second portion 644B collocated with a controller (not shown) such as the controller 540. The first portion 644A may select three of the four video streams (635L, 635R, 665L, 665R) to be transmitted from the camera platform 670 to the controller. For example, the three selected video streams may be transmitted from the first portion 644A to the second portion 644B via wire cables, fiber optic cables, or wireless connections. The second portion 644B may then route the three selected video streams to provide a 2D video output and a 3D video output.

In the example of FIG. 6A, the video streams 635L, 635R from the wide IOD camera head 630 have been selected for the 3D video output and the right video stream 635R from the wide IOD camera has been selected for the 2D video output. In the example of FIG. 6B, the video streams 665L, 665R from the narrow IOD camera head 660 have been selected for the 3D video output and the right video stream 635R from the wide IOD camera has been selected for the 2D video output.

Commonly, the 2D video output and at least one side (left or right) of the 3D video output may be displayed on monitors to allow a production director or other operator to view the images being captured. In the example of FIG. 6A, both the 2D video output and the 3D video output are generated by the wide IOD camera head 630. In this case, the output selector 644 may also provide a preview monitor output to allow the image captured by the narrow IOD camera head 660 to be viewed. A preview monitor video output is not required (but may be provided) in the example of FIG. 6B.

Figure 7:
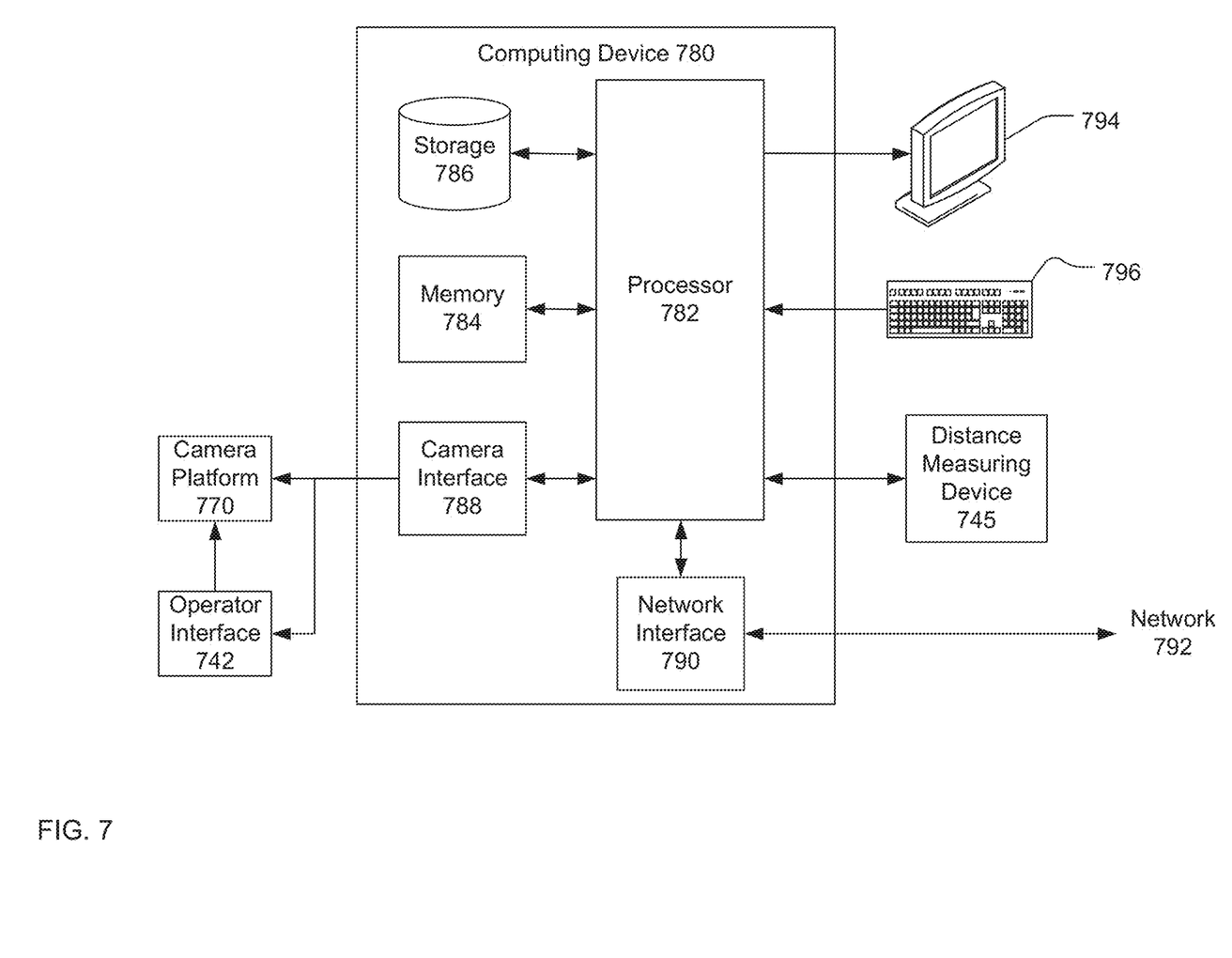
FIG. 7 is a block diagram of a computing device.

FIG. 7 is a block diagram of a computing device 780 that may be suitable for the controller 540. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 780 may include hardware, firmware, and/or software adapted to perform the processes subsequently described herein. The computing device may include a processor 782 coupled to memory 784 and a storage device 786.

The storage device 786 may store instructions which, when executed by the computing device 780, cause the computing device to provide the features and functionality of the controller 540. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 780 may include or interface with a display device 794 and one or more input devices such as a keyboard 796. The computing device 780 may also include a network interface unit 790 to interface with one or more networks 792. The network interface unit 790 may interface with the network 792 via a wired or wireless connection. The network 792 may be the Internet or any other private or public network.

The computing device 780 may receive distance data from a distance measuring device 745. The computing device 780 may be coupled to the distance measuring device 745 by a dedicated wired or wireless connection or via a network.

The computing device 780 may also include a camera interface unit 788 to interface with a camera platform 770, and/or a camera operator interface 742. The camera interface unit 788 may include a combination of circuits, firmware, and software to interface with the camera platform 770, and/or the camera operator interface 742. The camera interface unit 788 may be coupled to the camera platform 770, and/or the camera operator interface 742 via a network which may be a local area network; via one or more buses such as a USB bus, a PCI bus, a PCI Express bus, or other parallel or serial data bus; or via one or more direct wired or wireless connections. The camera interface unit 788 may be coupled to the camera platform 770, and/or the camera operator interface 742 via a combination of one or more of direct connections, network connections, and bus connections.

The processes, functionality and features of the computing device 780 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 780 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 782 and others by other devices.

Description of Processes

Figure 8:
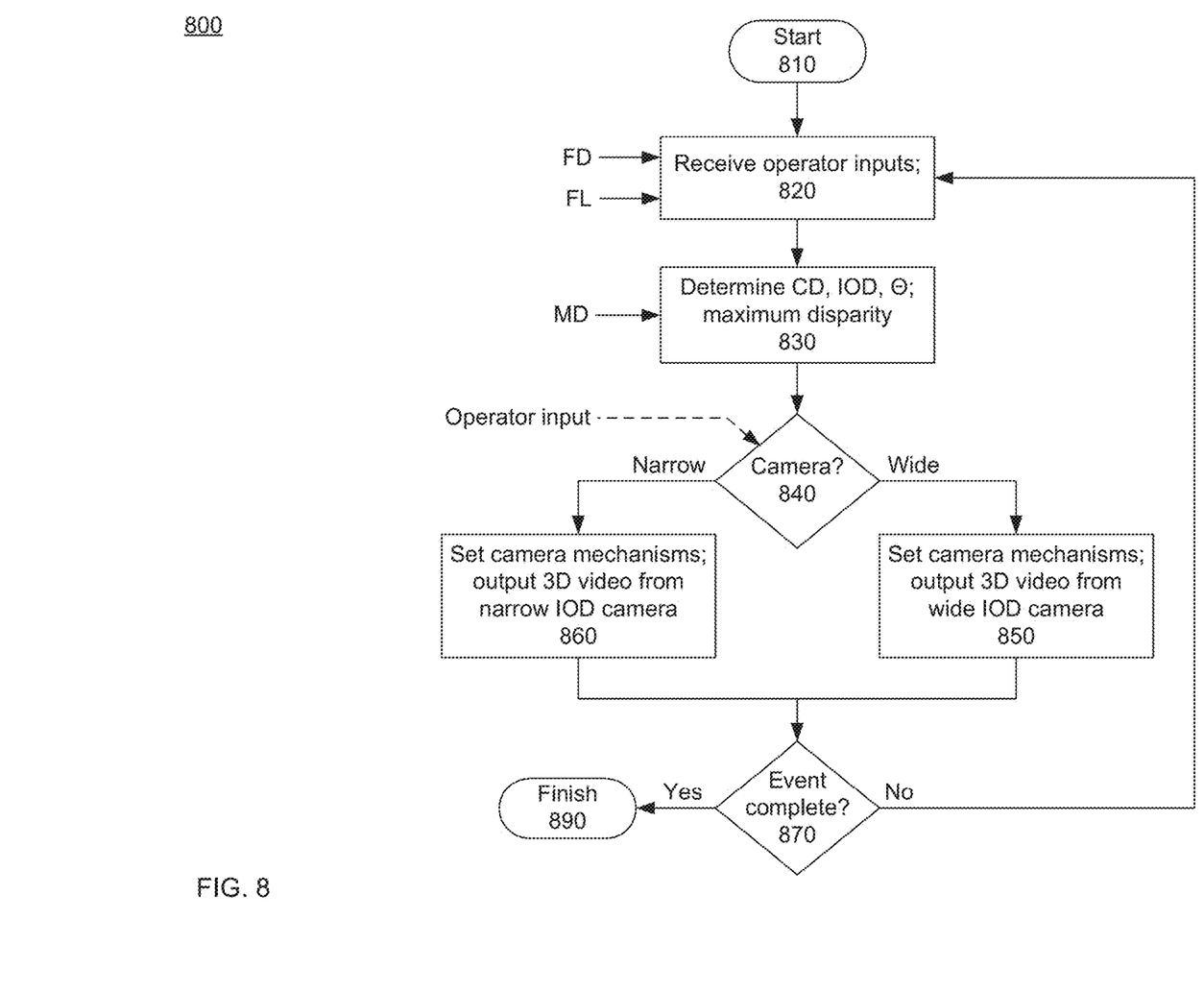
FIG. 8 is a flow chart of a process for capturing stereographic images.

FIG. 8 is a flow chart of an exemplary process 800 for recording stereographic images of an event using a stereographic camera system, such as the stereographic camera system 500, which includes a wide IOD camera head and a narrow IOD camera head. The process 800 may be performed primarily by a controller, such as the controller 540, which may be a computing device such as the computing device 780. For ease of description, the flow chart has a start 810, a finish 890, and a series of sequential actions. However, the process 800 is continuous in nature and the actions from 820 to 870 may be performed continuously, nearly simultaneously, and in near-real time during the recording of the event.

Within this patent, the phrase "near-real time" means in real time except for processing delays that are very short compared with temporal events in the scene being recorded.

At 820, the stereographic camera system may receive operator inputs indicating a desired focus distance of lenses in the stereographic camera, and a desired focal length or zoom value of the lenses. The focus distance and the focal length may be input by one or more operators such as a cameraman, assistant cameraman, or director. Although not shown in FIG. 8, the operator inputs received at 820 may include inputs to control a pointing mechanism to aim the camera system at an object of interest within the scene.

At 830, the convergence distance CD may be determined based on the focus distance from 820. CD may be set equal to the focus distance, or may be calculated using either formula (3) or formula (4) as described above. When CD is calculated, a focus distance to convergence distance offset parameter may be fixed or input by the operator.

Television broadcast cameras typically use small lens apertures to provide a large depth of focus. The operator of a broadcast camera may set the lens focus distance to a point beyond or in front of the primary scene object to provide the best overall focus over the entire depth of the scene. In such circumstances, a camera system may include a distance sensor, such as the distance sensor 545, to determine a measured distance MD to the primary scene object. When a distance sensor is available, at 830, the convergence distance CD may be determined based on MD instead of FD. CD may be set equal to MD, or may be calculated using either formula (3) or formula (4), substituting MD for FD in either formula.

At 830, a preferred interocular distance IOD may also be calculated. IOD may be calculated based on the focal length input received at 820, CD as determined at 830, and the known or presumed distances to a closest scene object and/or a most distant scene object. IOD may be calculated, for example, as described in U.S. Pat. No. 7,899,321 B1, entitled Stereo Camera with Automatic Control of Interocular Distance. A convergence angle Θ may be calculated at 830 based on CD and IOD.

Additionally, at 830 a maximum image disparity may be calculated for the wide IOD camera head using the focus distance and focal length from 820 and the assumption that the IOD of the wide IOD camera head is set to its minimum possible value. The maximum disparity may be calculated based on known or assumed distance to objects in the scene, or and/or object distances estimated by analysis of the left and right images being captured. The maximum disparity may be determined directly from analysis of the left and right images. Both a maximum forward disparity (disparity of objects that appear to be in front of a viewing screen) and a maximum back disparity (disparity of objects that appear to be behind the viewing screen) may be calculated at 830.

At 840, a determination may be made if the image from the wide IOD camera head or the image from the narrow IOD camera head will be selected as a 3D video output. The selection of the wide IOD camera head or the narrow IOD camera head may be made based on an operator input. The selection of the wide IOD camera head or the narrow IOD camera head may be made automatically based on some or all of the focus distance and focal length inputs received at 820, the camera parameters determined at 830, and scene characteristics such as MD.

Figure 9:
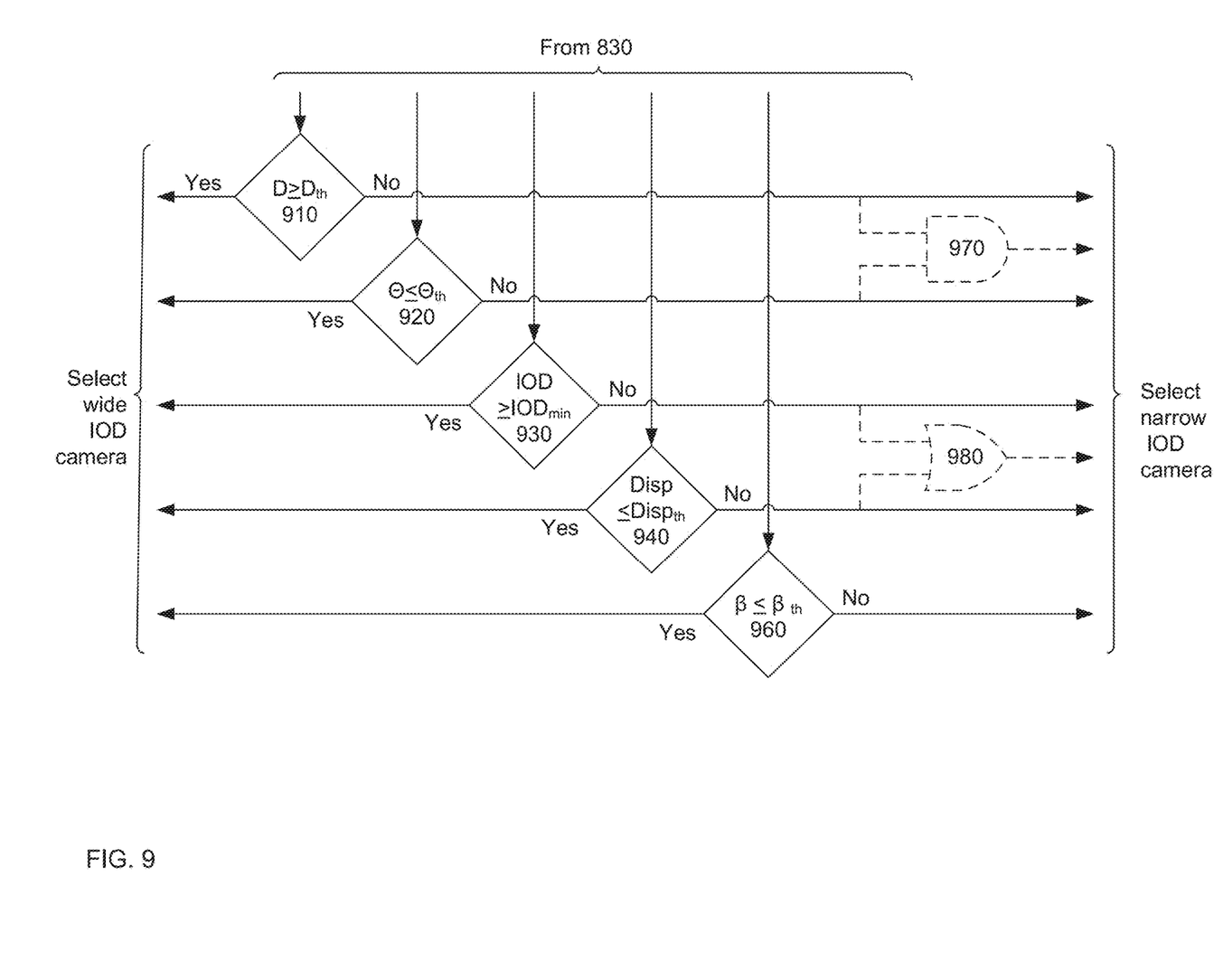
FIG. 9 is a flow chart of a process for selecting either an image captured by a wide IOD camera or an image captured by a narrow IOD camera.

FIG. 9 shows exemplary criteria for selecting the image from either a wide IOD camera head or a narrow IOD head based on one or more characteristics of the cameras and the scene to be captured. At 910, the narrow IOD camera head may be selected if a distance, such as a focus distance, a convergence distance, or a measured distance, determined at 820 or 830 is less than a predetermined threshold distance ("No" at 910). At 920, the narrow IOD camera head may be selected if the convergence angle calculated at 830 is greater than a threshold convergence angle ("No" at 920). At 930, the narrow IOD camera may be selected if the IOD calculated at 830 is less than a minimum IOD of the wide IOD camera head ("No" at 930). At 940, the narrow IOD camera may be selected if disparity calculated at 830 is greater than a predetermined threshold disparity ("No" at 940). At 950 the narrow IOD camera may be selected if the tilt angle β of a camera platform such as the stereographic camera platform 470, is greater than or equal to a predetermined minimum β ("No" at 950). Any one or more of distance D, convergence angle Θ, IOD, disparity, and tilt angle β may be used to select either the wide IOD or narrow IOD cameras. For example, the narrow IOD camera may be selected if a distance determined at 830 is less than its threshold value and the convergence angle determined at 830 is greater than its threshold value, as indicated by the AND gate 970. For further example, the narrow IOD camera may be selected if either the IOD determined at 830 is less than the minimum IOD of the wide IOD camera head, or the disparity is greater than a threshold disparity, as indicated by the OR gate 980. The wide IOD camera may be selected by default whenever the narrow IOD camera is not selected.

Referring back to FIG. 8, when a determination is made at 840 to use the image captured by the wide IOD camera head for the 3D video output, the mechanisms of the wide IOD camera head may be set and the image captured by the wide IOD camera head may be output at 850. The focus distance and focal length of the lenses in the wide IOD camera head may be bet in accordance with the operator inputs received at 820. An IOD mechanism and a convergence mechanism within the wide IOD camera head may be set in accordance with the IOD and Θ values determined at 830. The video streams from the left and right cameras of the wide IOD camera head may be output for broadcasting and/or recording.

When a determination is made at 840 to use the image captured by the narrow IOD camera head for the 3D video output, the mechanisms of the narrow IOD camera head may be set and image captured by the narrow IOD camera head may be output at 860. However, since the image captured by the narrow IOD camera head may be output only when the object of interest is close to the camera, one or more of the focal length, interocular distance, and convergence angle of the narrow IOD camera head may be fixed. In special situations, such as the camera position shown in the example of FIG. 4, even the focus distance of the narrow IOD camera head may be fixed. At 860, the focus distance and focal length, if adjustable, of the lenses in the narrow IOD camera head may be set in accordance with the operator inputs received at 820. An IOD mechanism and a convergence mechanism, if present within the narrow IOD camera head, may be set in accordance with the IOD and Θ values determined at 830. The video signals from the left and right cameras of the narrow IOD camera head may be output for broadcasting and/or recording.

At 870, a determination may be made if the event being captured has been completed. When the event is ongoing, the process 800 may repeat continuously and in near real-time from 810. When the event has been completed, the process 800 may finish at 890.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A stereographic camera system, comprising:
   a camera platform comprising:
   a first stereographic camera head including a first left camera and a first right camera separated by a first interocular distance settable over a first range, the first stereographic camera head providing a first left video stream and a first right video stream; and
   a second stereographic camera head aligned with the first stereographic camera, the second stereographic camera including a second left camera and a second right camera separated by a second interocular distance settable over a second range, at least a portion of the second range smaller than the first range, the second stereographic camera head providing a second left video stream and a second right video stream; and
   an output selector to automatically select either the first left and right video streams or the second left and right video streams to output as a 3D video output based on one or more of
   a focus distance of lenses in one or both of the first camera head and the second camera head,
   a convergence distance of one or both of the first camera head and the second camera head,
   a measured distance from the camera platform to a scene object,
   a convergence angle,
   a disparity,
   a tilt angle, and
   a desired interocular distance.

2. The stereographic camera system of claim 1, wherein the second range consists of a single fixed distance.

3. The stereographic camera system of claim 1, wherein the output selector is configured to:
   select the first left and right video streams to output as the 3D video output if the focus distance is greater than or equal to a predetermined threshold focus distance, and
   select the second left and right video streams to output as the 3D video output if the focus distance is less than the predetermined threshold focus distance.

4. The stereographic camera system of claim 1, wherein the output selector is configured to:
   select the first left and right video streams to output as the 3D video output if the convergence distance is greater than or equal to a predetermined threshold convergence distance, and
   select the second left and right video streams to output as the 3D video output if the convergence distance is less than the predetermined threshold convergence distance.

5. The stereographic camera system of claim 1, wherein the output selector is configured to:
   select the first left and right video streams to output as the 3D video output if the measured distance is greater than or equal to a predetermined threshold measured distance, and
   select the second left and right video streams to output as the 3D video output if the measured distance is Less than the predetermined threshold measured distance.

6. The stereographic camera system of claim 1, further comprising a controller coupled to the camera platform and configured to:
   determine the desired interocular distance based, at least in part, upon the focus distance and the focal length,
   when the desired interocular distance is within the first range, set the first interocular distance to the desired interocular distance and cause the output selector to select the first video stream, and
   when the desired interocular distance is less than the first range, cause the output selector to select the second video stream.

7. The stereographic camera system of claim 1, wherein the output selector is further configured to:
   select one of the first left video stream, the first right video stream, the second left video stream, and the second right video stream to output as a 2D video output.

8. The stereographic camera system of claim 7, wherein the output selector is further configured to:
   select one of the first left video stream, the first right video stream, the second left video stream, and the second right video stream to output as a preview monitor video output.

9. The stereographic camera system of claim 1, wherein the output selector comprises:
   a first portion collocated with the camera platform; and
   a second portion located remote from the camera platform, wherein
   the first portion is configured to select three streams from the first left video stream, the rust right video stream, the second left video stream, and the second right video stream to transmit from the camera platform to the second portion, and
   the second portion is configured to distribute the three selected streams to provide the 3D video output and the 2D video output.

10. A method for controlling a stereographic camera including a first stereographic camera head having a first interocular distance settable over a first range and a second stereographic camera head having a second interocular distance settable over a second range, at least a portion of the second range smaller than the first range, the process comprising:

selecting either a first left video stream and a first right video stream generated by the first stereographic camera head or a second left video stream and a second right video stream generated by the second stereographic camera head to output as a 3D video output based on one or more of:
a focus distance of lenses in one or both of the first camera head and the second camera head,
a convergence distance of one or both of the first camera head and the second camera head,
a measured distance from the camera platform to a scene object, a convergence angle,
a disparity,
a tilt angle, and
a desired interocular distance.

11. The method for controlling a stereographic camera of claim 10, wherein the second range consists of a single fixed distance.

12. The method for controlling a stereographic camera of claim 10, wherein selecting either the first left video stream and the first right video stream or the second left video stream and the second right video stream to output as a 3D video output comprises:
selecting the first left and right video streams if the focus distance is greater than or equal to a predetermined threshold focus distance, and
selecting the second left and right video streams if the focus distance is less than the predetermined threshold focus distance.

13. The method for controlling a stereographic camera of claim 10, wherein selecting either the first left video stream and the first right video stream or the second left video stream and the second right video stream to output as a 3D video output comprises:
selecting the first left and right video streams if the convergence distance is greater than or equal to a predetermined threshold convergence distance, and
selecting the second left and right video streams if the convergence distance is less than the predetermined threshold convergence distance.

14. The method for controlling a stereographic camera of claim 10, wherein selecting either the first left video stream and the first right video stream or the second left video stream and the second right video stream to output as a 3D video output comprises:
selecting the first left and right video streams if the measured distance is greater than or equal to a predetermined threshold measured distance, and
selecting the second left and right video streams if the measured distance is less than the predetermined threshold measured distance.

15. The method for controlling a stereographic camera of claim 10, wherein selecting either the first left video stream and the first right video stream or the second left video stream and the second right video stream to output as a 3D video output comprises:
determining a desired interocular distance based, at least in part, upon the focus distance and the focal length,
when the desired interocular distance is within the first range, setting the first interocular distance to the desired interocular distance and selecting the first left and right video streams, and
when the desired interocular distance is less than the first range, selecting the second left and right video streams.

16. The method for controlling a stereographic camera of claim 10, further comprising:
selecting one of the first left video stream, the first right video stream, the second left video stream, and the second right video stream to output as a 2D video output.

17. The method for controlling a stereographic camera of claim 16, further comprising:
selecting one of the first left video stream, the first right video stream, the second left video stream, and the second right video stream to output as a preview monitor video output.

18. The method for controlling a stereographic camera of claim 16, further comprising:
selecting three streams from the first left video stream, the first right video stream, the second left video stream, and the second right video stream to transmit from a camera platform to a location remote from the camera platform and
distributing the three selected streams at the remote location to provide the 3D video output and the 2D video output.

* * * * *